United States Patent
Stocks et al.

(10) Patent No.: US 6,506,241 B1
(45) Date of Patent: Jan. 14, 2003

(54) BIX-AZO NAPHTHYLENE COMPOUNDS AND THEIR USE IN COMPOSITIONS AND INKS FOR INK-JET PRINTING

(75) Inventors: Julie Ann Stocks, Manchester (GB); Paul Wight, Manchester (GB)

(73) Assignee: Avecia Limited, Blackley (GB)

( * ) Notice: Subject to any disclaimer, the term of this patent is extended or adjusted under 35 U.S.C. 154(b) by 152 days.

(21) Appl. No.: 09/613,455

(22) Filed: Jul. 10, 2000

(30) Foreign Application Priority Data

Jul. 10, 1999 (GB) .............................................. 9916110

(51) Int. Cl.⁷ ......................... C09D 11/02; C09B 29/09; B05D 1/26; B32B 3/00; B32B 27/14

(52) U.S. Cl. ................ 106/31.48; 106/31.77; 534/803; 8/639; 427/466; 428/195

(58) Field of Search ............................ 106/31.48, 31.77; 8/639; 534/803; 427/466; 428/195

(56) References Cited

U.S. PATENT DOCUMENTS

| | | | | |
|---|---|---|---|---|
| 5,762,653 A | * | 6/1998 | Adam et al. ................. | 534/797 |
| 5,773,593 A | * | 6/1998 | Gregory et al. .......... | 106/31.48 |
| 5,843,217 A | * | 12/1998 | Ueda et al. ............... | 106/31.48 |
| 5,972,084 A | * | 10/1999 | Lacroix et al. .......... | 106/31.36 |

FOREIGN PATENT DOCUMENTS

| | | |
|---|---|---|
| JP | 98-357193 | 12/1998 |
| WO | WO 00/15723 | 3/2000 |

OTHER PUBLICATIONS

CAS registry entry number 193486–82–7, No date available.

* cited by examiner

Primary Examiner—Helene Klemanski
(74) Attorney, Agent, or Firm—Pillsbury Winthrop LLP

(57) ABSTRACT

Compounds of the Formula (1) and salts thereof:

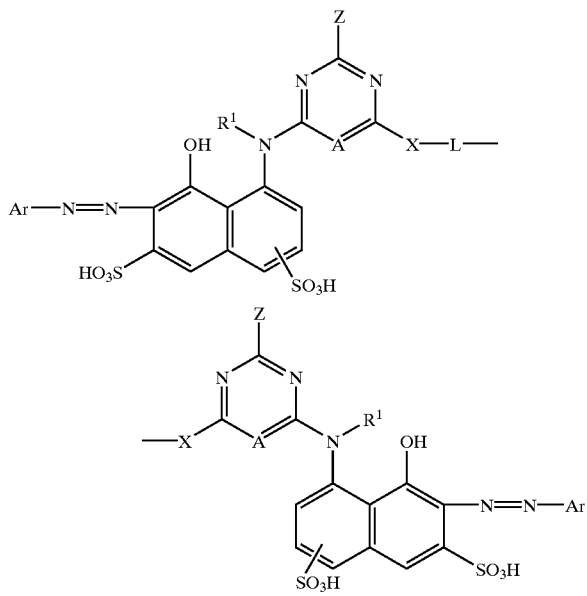

Formula (1)

wherein:
each A independently is N, C—Cl, C—CN or C—NO₂;
each Ar independently is a substituted aryl group carrying a —COOH group ortho to the
azo (—N═N—) group;
L is an aliphatic group carrying a —COOH, —SO₃H or —PO₃H₂ group;
each Z independently is —SR², —OR³, —NR⁴R⁵ or a labile atom or group;
each X independently is —S—, —O— or —NR¹—;
each R¹ independently is H or optionally substituted alkyl; and
R², R³, R⁴ and R⁵ are independently H, optionally substituted alkyl, optionally substituted aryl or optionally substituted aralkyl; or
R⁴ and R⁵ together with the nitrogen to which they are attached form an optionally substituted five or six membered ring, and their use in compositions and inks for ink jet printing processes and ink jet printer cartridges.

22 Claims, No Drawings

BIX-AZO NAPHTHYLENE COMPOUNDS AND THEIR USE IN COMPOSITIONS AND INKS FOR INK-JET PRINTING

This invention relates to compositions, to inks and to dyes and to their use in ink jet printing ("IJP").

IJP is a non-impact printing technique in which droplets of ink are ejected through a fine nozzle onto a substrate without bringing the nozzle into contact with the substrate.

There are many demanding performance requirements for dyes in inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

According to the first aspect of the present invention there is provided a compound of the Formula (1) and salts thereof:

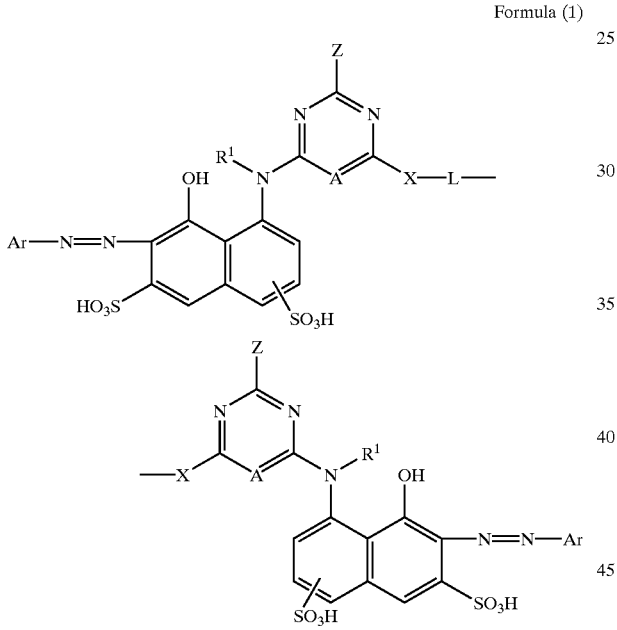

Formula (1)

wherein:
  each A independently is N, C—Cl, C—CN or C—$NO_2$;
  each Ar independently is a substituted aryl group carrying a —COOH group ortho to the azo (—N=N—) group;
  L is an aliphatic group carrying a —COOH, —$SO_3H$ or —$PO_3H_2$ group;
  each Z independently is —$SR^2$, —$OR^3$, —$NR^4R^5$ or a labile atom or group;
  each X independently is —S—, —O— or —$NR^1$—;
  each $R^1$ independently is H or optionally substituted alkyl; and
  $R^2$, $R^3$, $R^4$ and $R^5$ are each independently H, optionally substituted alkyl, optionally substituted aryl or optionally substituted aralkyl; or
  $R^4$ and $R^5$ together with the nitrogen to which they are attached form an optionally substituted five or six membered ring.
Preferably each A is N.

Preferably the aryl groups represented by Ar contain up to 12 carbon atoms, more preferably up to 10 carbon atoms and optionally contain one or more hetero atoms selected from O, S and N. The aryl groups optionally carry one or more substituents in addition to the —COOH group ortho to the azo group in Formula (1).

Suitable aryl groups containing one or more hetero atoms include pyridyl, pyrazolyl, thienyl or indanyl. It is preferred however that the aryl groups are free from hetero atoms, for example phenyl or naphthyl.

More preferably each Ar independently is optionally substituted 1-carboxy-naphth-2-yl or optionally substituted 2-carboxy phenyl. It is especially preferred that each Ar independently is of the Formula (2) or (3):

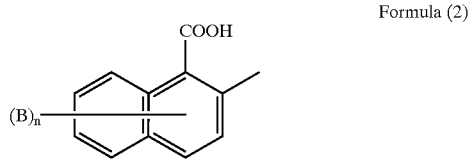

Formula (2)

Formula (3)

wherein:
  each B independently is —OH, —$SO_3H$, —$PO_3H_2$, —COOH, —$CF_3$, optionally substituted alkyl, optionally substituted alkoxy, optionally substituted amino, halo, —$NO_2$, —CN or —$SO_2T$;
  T is optionally substituted alkyl (preferably optionally substituted $C_{1-10}$-alkyl) optionally substituted aryl (preferably optionally substituted phenyl), —$NR^6R^7$, vinyl or a group convertible to vinyl on treatment with aqueous alkali;
  $R^6$ and $R^7$ are each, independently, H, optionally substituted alkyl or optionally substituted aryl, or $R^6$ and $R^7$ together with the nitrogen to which they are attached form an optionally substituted piperazinyl, morpholinyl or piperidinyl ring;
  n is 0 to 6; and
  p is 0 to 4.

Preferably $R^6$ and $R^7$ are each independently H, optionally substituted $C_{1-10}$-alkyl or optionally substituted phenyl, more preferably H, optionally substituted $C_{1-6}$-alkyl or optionally substituted phenyl.

When T is a group which is convertible to vinyl on treatment with aqueous alkali it is preferably of the formula —$CH_2CH_2OSO_3H$, —$CH_2CH_2SSO_3H$, —$CH_2CH_2Cl$ or —$CH_2CH_2OCOCH_3$. Preferably T is —$NR^6R^7$, —CH=$CH_2$ or —$CH_2CH_2OSO_3H$ and especially —CH=$CH_2$ or —$NR^6R^7$, wherein $R^6$ and $R^7$ are as hereinbefore defined.

Preferably each B independently is —COOH, —$SO_3H$, —$PO_3H_2$, —$CF_3$, optionally substituted $C_{1-10}$-alkoxy, optionally substituted $C_{1-10}$-alkyl, optionally substituted amino —$SO_2CH=CH_2$, —Cl, —Br, —I, —CN, —OH, —$NO_2$ or —$SO_2NR^6R^7$, wherein $R^6$ and $R^7$ are as hereinbefore defined.

Preferred optional substituents on B are selected from $C_{1-6}$-alkyl, $C_{1-6}$-hydroxyalkyl, $C_{1-6}$-alkoxy, $C_{1-4}$-alkylCO, —OH, —$SO_3H$, —COOH, —CN, —$PO_3H_2$, halo and —$NH_2$.

In a preferred embodiment each B independently is —COOH, —SO$_3$H, —OH, —CF$_3$, Cl, —NH$_2$, —NHCOC$_{1-4}$-alkyl, —NHC$_{1-4}$-alkyl, —NHC$_{1-4}$-hydroxyalkyl, C$_{1-6}$-alkoxy —SO$_2$NHC$_{1-4}$-alkyl, —SO$_2$NHC$_{1-4}$-hydroxyalkyl or C$_{1-6}$-alkyl optionally substituted by —OH, —COOH, —NH$_2$ or —SO$_3$H. It is especially preferred that each B independently is C$_{1-4}$-alkyl, —COOH, —OH, —SO$_3$H or —NHCOC$_{1-4}$-alkyl, more especially methyl, ethyl, —NHCOCH$_3$ or —COOH.

Preferably any substituents represented by B in Formulae (2) and (3) are located in a position other than the ortho position relative to the azo group in Formula (1).

Preferably each n independently is 0, 1 or 2, more preferably 0.

Preferably each p independently is 0, 1 or 2, more preferably 0.

In a preferred embodiment each Ar is, independently, of the Formula (3) wherein each p is 0, 1 or 2 (preferably 0) and each B is as hereinbefore defined, more preferably —COOH, —OH, —SO$_3$H or —Cl. It is especially preferred that each Ar is 2-carboxyphenyl. For ease of synthesis it is preferred that each Ar is the same.

Preferably each R$^1$ independently is H or optionally substituted C$_{1-6}$-alkyl, more preferably H or C$_{1-4}$-alkyl optionally substituted by —COOH, —SO$_3$H, —CN or more preferably —OH. It is especially preferred that each R$^1$ independently is H, methyl, ethyl or hydroxyethyl. It is most preferred that each R$^1$ is H.

Preferably each X independently is —S— or —NR$^1$—, more preferably —NR$^1$— and especially —NH—.

When R$^2$, R$^3$, R$^4$ or R$^5$ is optionally substituted alkyl it is preferably optionally substituted C$_{1-20}$-alkyl, more preferably optionally substituted C$_{1-10}$-alkyl and especially optionally substituted C$_{1-6}$-alkyl. Preferred optional substituents include C$_{1-6}$-alkoxy, C$_{1-6}$-hydroxyalkoxy, —OH, —COOH, —SO$_3$H, —PO$_3$H$_2$, —CN, a 5- or 6-membered heterocyclic group or optionally substituted amino. Preferred 5- or 6-membered heterocyclic groups are furanyl, tetrahydrofuranyl, piperazinyl and morpholinyl each of which is optionally substituted by —OH, —COOH, —SO$_3$H or C$_{1-4}$-alkyl.

When any of R$^2$, R$^3$, R$^4$ or R$^5$ is optionally substituted aryl it is preferably optionally substituted phenyl or naphthyl, more preferably optionally substituted phenyl. Preferred optional substituents are C$_{1-6}$-alkoxy, halo (preferably F or Cl), —OH, —CN, —COOH, —SO$_3$H, —PO$_3$H$_2$, —NO$_2$, —NH$_2$, —COC$_{1-4}$-alkyl, —NHCOC$_{1-4}$-alkyl-(C$_{1-6}$-alkylene)O(C$_{1-6}$-alkylene)OC$_{1-4}$-alkyl,-(C$_{2-6}$-alkylene)O(C$_{2-6}$-alkylene)OH, —SO$_2$NH$_2$, —SO$_2$NHC$_{1-4}$-alkyl, C$_{1-6}$-alkyl or C$_{1-6}$-alkyl substituted by —OH, —COOH or —SO$_3$H.

Examples of aryl groups which may be represented by any of R$^2$, R$^3$, R$^4$ or R$^5$ include 2-sulphophenyl, 2-carboxyphenyl, 4-sulphophenyl, 4-carboxyphenyl, 2-carboxy-4-suiphophenyl, 3-carboxy-2-methyl-phenyl, 4-methyl-3-sulpho-phenyl or 2,6-dimethylphenyl.

When any of R$^2$, R$^3$, R$^4$ or R$^5$ is optionally substituted aralkyl it is preferably of the formula:

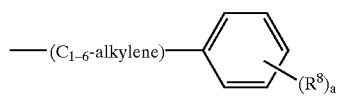

wherein
each R$^8$ independently is C$_{1-4}$-alkyl, C$_{1-4}$-alkoxy, halo, —OH, —NH$_2$, —COOH, —SO$_3$H or —PO$_3$H$_2$; and
a is 0 to 5.

a is preferably 0, 1 or 2.

Especially preferred aralkyl groups which may be represented by R$^2$, R$^3$, R$^4$ or R$^5$ are benzyl or 2-phenylethyl, each of which is optionally substituted by —COOH, —OH or —SO$_3$H.

When R$^4$ and R$^5$ together with the nitrogen to which they are attached form an optionally substituted 5 or 6 membered ring it is preferably an optionally substituted piperazinyl, piperidinyl or morpholinyl ring. The optional substituents on the ring are preferably selected from —OH, —COOH, —SO$_3$H, C$_{1-6}$-alkoxy, C$_{1-6}$-alkyl and C$_{1-6}$-alkyl substituted by —OH, —COOH or —SO$_3$H.

When Z is a labile atom or group, it is preferably an atom or group which is displaceable by a hydroxyl group of cellulose under mildly alkaline aqueous conditions to form a covalent bond between the dye of Formula (1) and cellulose.

Preferred labile atoms and groups which may be represented by Z include halogen atoms, for example F or Cl; sulphonic acid groups; thiocyano groups; quaternary ammonium groups, for example trialkylammonium groups and optionally substituted pyridinium groups, for example 3- and 4-carboxy pyridinium groups. An especially preferred labile atom is Cl.

It is preferred, however, that each Z independently is —SR$^2$, —OR$^3$ or —NR$^4$R$^5$, more preferably —OH, —SR$^2$ or —NR$^4$R$^5$ wherein R$^2$, R$^4$ and R$^5$ are as hereinbefore defined. It is especially preferred that each Z independently is —OH, —SH or —NR$^9$R$^{10}$ wherein R$^9$ and R$^{10}$ each independently is H, C$_{1-6}$-alkyl optionally substituted by —OH, C$_{1-4}$-alkoxy, C$_{1-4}$-hydroxyalkoxy, —COOH or —SO$_3$H. Most preferably each Z independently is —OH, —SH or —NH$_2$.

The floating —SO$_3$H groups in Formula (1) are preferably attached at the 4- or, more preferably, the 3-position on the naphthylene groups in Formula (1) relative to the —NR$^1$-group.

L preferably contains less than 20, more preferably less than 10 carbon atoms. L may contain one or more hetero atoms, for example oxygen, nitrogen or sulphur, or a combination thereof. For example, L may contain an ester, amide or —SS— group. L may be linear or branched but is preferably linear. L may be unsaturated or, more preferably, saturated.

Preferably L is an optionally interrupted alkenylene group or more preferably an optionally interrupted alkylene group containing up to 20, more preferably up to 10 carbon atoms, said group carrying a substituent selected from —COOH, —SO$_3$H and —PO$_3$H$_2$. When L is alkylene it is preferably optionally interrupted C$_{2-20}$-, more preferably C$_{2-10}$- and especially C$_{2-6}$-alkylene which carries a substituent selected from —COOH, —SO$_3$H and —PO$_3$H$_2$. When L is interrupted alkylene or alkenylene the interruption(s) is/are preferably one or more hetero atoms, preferably —O—, —S—, —SS— or —NR$^1$— wherein R$^1$ is as hereinbefore defined.

It is especially preferred that L is a straight chain C$_{2-6}$-alkylene group optionally interrupted by one or more —SS— group, wherein the alkylene group carries a substituent selected from —COOH, —SO$_3$H and —PO$_3$H$_2$.

L may carry more than one substituent selected from —COOH, —SO$_3$H and —PO$_3$H$_2$, or other substituents in addition those selected from —COOH, —SO$_3$H and —PO$_3$H$_2$, for example —OH. However, it is preferred that the substituents on L are selected from the group consisting of —COOH, —SO$_3$H and PO$_3$H$_2$. More preferably L is substituted by one or more —SO$_3$H or —COOH group. It especially preferred that L is substituted by one or more —COOH group.

Examples of preferred aliphatic groups represented by L include —CH(COOH)CH$_2$—S—S—CH$_2$CH(COOH)—, —CH$_2$CH(COOH)CH$_2$— and —CH$_2$CH$_2$CH$_2$CH(COOH)—.

The compounds of Formula (1) may exist in tautomeric forms other than those shown in this specification, for example the hydrazo tautomer. These tautomers are included within the scope of the present claims.

The compounds of Formula (1) have a high solubility in aqueous media and provide bright magenta prints with a good light-fastness when incorporated into inks for ink jet printing.

In view of the foregoing preferences, preferred compounds of the Formula (1) are of Formula (4) and salts thereof:

Preferably $L^1$ is a straight chain $C_{2-10}$-, more preferably a $C_{2-6}$-alkylene group which carries a one or more substituents selected from —COOH and —SO$_3$H.

Especially preferred compounds of the Formula (4) are those wherein $L^1$ is $C_{2-10}$-alkylene carrying a —COOH group and each Z is —OH, —SH or —NR$^9$R$^{10}$ (especially —NH$_2$), wherein $R^9$ and $R^{10}$ are as hereinbefore defined.

The compounds according to the first aspect of the invention may be in the free acid or salt form. Preferred salts are alkali metal salts, especially lithium, sodium and potassium salts, ammonium and substituted ammonium salts. Especially preferred salts are salts with sodium, lithium, ammonia and volatile amines and mixed salts thereof, especially mixed lithium/sodium salts. The compounds may be converted into a salt using known techniques. For example, an alkali metal salt may be converted into a salt with ammonia or an amine by dissolving an alkali metal salt in Formula (4)

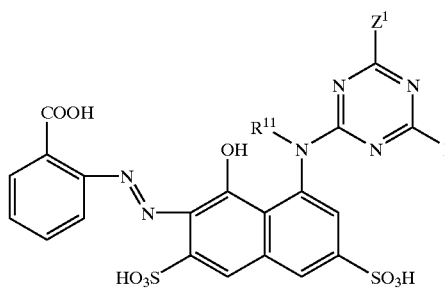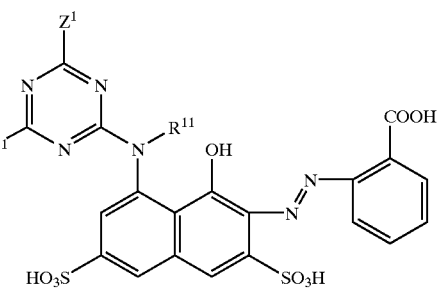

wherein:
$L^1$ is a $C_{2-20}$-alkylene group carrying a —SO$_3$H or —COOH group;
each $R^{11}$ independently is H or $C_{1-4}$-alkyl optionally substituted by —OH, —COOH, —SO$_3$H or —CN;
each $Z^1$ independently is —SR$^2$, —OR$^3$ or —NR$^4$R$^5$; and $R^2$, $R^3$, $R^5$ and $R^5$ are as hereinbefore defined.

The compounds of Formula (4) exhibit a particularly high aqueous solubility and when incorporated into inks suitable for use in an ink jet printer, provide prints with a high light-fastness.

water, acidifying with a mineral acid and adjusting the pH of the solution to pH 9 to 9.5 with ammonia or the amine and removing the alkali metal cations by dialysis, reverse osmosis or ultrafiltration.

The compounds of the invention may be prepared using conventional techniques for the preparation of azo dyes. For example a suitable method comprises condensing a molar excess of the compound of the formula ZH with the compound of the Formula (5):

Formula (5)

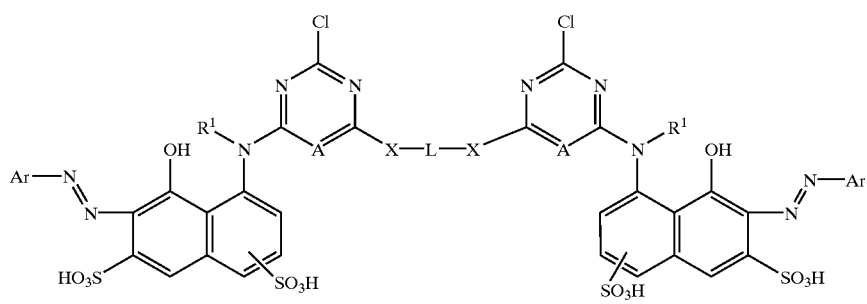

Preferably each $R^{11}$ independently is H or $C_{1-4}$-alkyl optionally substituted by —OH. More preferably each $R^{11}$ is H.

Preferably each $Z^1$ independently is —OH, —SH or —NR$^9$R$^{10}$, wherein $R^9$ and $R^{10}$ are as hereinbefore defined.

wherein L and each Z, Ar, $R^1$, X and A are as hereinbefore defined.

The condensation is preferably performed in a liquid medium, more preferably an aqueous medium and especially water. Temperatures of 10° C. to 100° C. are preferred, more preferably from 20 to 95° C. Preferably a reaction time of 1 to 24, more preferably 1 to 4 hours is used.

The condensation is preferably performed in the presence of a suitable base and optionally with a catalyst, for example 4-dimethylaminopyridine.

The base may be any inorganic base for example, ammonia, an alkali metal or alkali earth metal hydroxide, carbonate or bicarbonate, or an organic base. The amount of base used may be varied between wide limits but it is preferred to use less than 40, more preferably less than 10 and especially from 3 to 5 moles for each mole of the compound of Formula (5).

After the condensation reaction the product may be isolated by precipitating the product as a salt from the reaction mixture for example by the addition of a suitable alkali metal salt, especially sodium chloride. Alternatively, the product may be isolated in its free acid form by acidifying the reaction mixture, preferably using a mineral acid, especially hydrochloric acid. Where the product precipitates as a solid it may be separated from the mixture by filtration.

If desired unwanted anions may be removed from the product of the above process by dialysis, osmosis, ultrafiltration or a combination thereof.

The product of the above process may be converted, if desired, to the $NH_4^+$, quaternary ammonium or organic amine salt by the addition of ammonia, ammonium hydroxide, primary, secondary, tertiary or quaternary amine.

The compound of Formula (5) may, for example, be prepared as follows:

Stage (a): diazotising amine of the formula $Ar-NH_2$ and coupling with the compound of the Formula

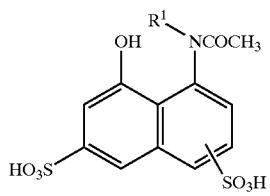

Formula (6)

Stage (b) hydrolysis, under alkaline conditions, to remove the acetyl group present in the product of stage (a);

Stage (c) condensing the product of stage (b) with an approximately molar equivalent of the compound of the Formula (7):

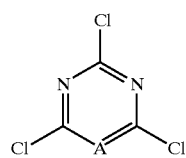

Formula (7)

stage(d) condensing a compound of the formula HX-L-XH with approximately 2 molar equivalents of the product of stage(c);

wherein Ar, and $R^1$, A, L and X are as hereinbefore defined.

The diazotisation in stage (a) is preferably performed in an aqueous medium at a pH below 7 in the presence of a suitable diazotisation agent. Dilute mineral acid, e.g. HCl or $H_2SO_4$, is preferably used to achieve the desired acidic conditions. Conveniently the diazotisation agent is formed in-situ, for example by dissolving an alkali metal nitrite, preferably sodium nitrite, in a molar excess of mineral acid, preferably HCl.

The temperature of the diazotisation is not critical and may conveniently be carried out at from −5° C. to 20° C., preferably from 0 to 10° C. and especially from 0 to 5° C.

The coupling reaction in stage (a) is preferably performed under mildly alkaline conditions, more preferably at a pH of 7–8.

The hydrolysis in stage (b) is preferably performed in aqueous NaOH at a reaction temperature of 50 to 90° C.

The condensations in stages (c) and (d) are preferably performed in the presence of a base.

The present invention also covers mixtures comprising two or more dyes of the Formula (1). Furthermore, the dyes of Formula (1) may be mixed with commercially available dyes, especially those listed in the colour Index International, to adjust the shade or other properties as desired.

According to a second aspect of the present invention there is provided a composition comprising:

(a) one or more compound of the Formula (1) according to the first aspect of the present invention; and (b) one or more water-soluble magenta dye other than a compound of Formula (1) according to the first aspect of the invention.

The water-soluble magenta dye is preferably a xanthene dye, an azo or bis azo dye, more preferably an anionic azo or bis azo dye and especially an azo or bis azo dye which contains one or more groups selected from sulphonate, carboxylate and thiocarboxylate groups.

Preferred water-soluble magenta dyes include C.I. Acid Red 50, 52, 87, 91, 92, 95, 249 and 289; C.I. Direct Violet 106 and 107; compounds 100 to 107, 200 and 201 described on pages 8 and 9 of WO 96/24636; compounds 1 to 24 shown described on cols. 4 to 10 in U.S. Pat. No. 5,542,970; compounds 1 to 55 described on pages 7 to 17 of EP-A-682 088; compounds 1 to 14 shown in Example 1 to 6 of EP-A-194,885; compounds 1 to 24 described on pages 8 to 13 of EP-A-717 089; the compounds described in examples 1 to 16 in cols 5 to 11 of U.S. Pat. No. 5,262,527; the dyes described in Examples 1 to 21 in WO 94/16021; and one or more dyes of the Formula (8) and salts thereof:

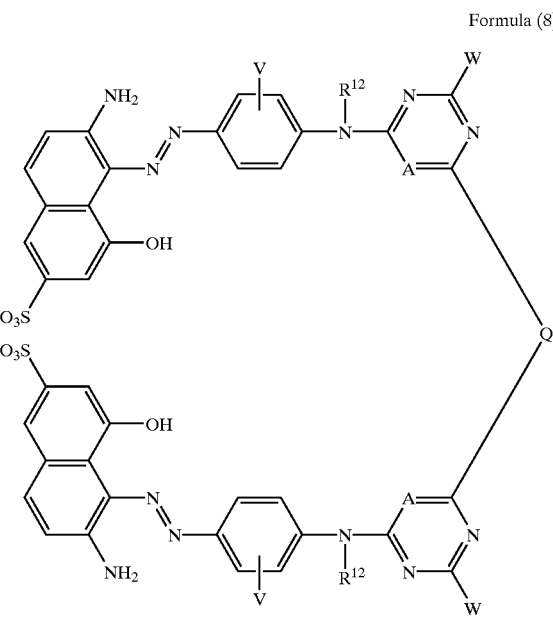

Formula (8)

wherein:

each v is independently, $-SO_3H$, $-COOH$, $-CF_3$, alkoxy, alkyl or $-PO_3H_2$;

Q is an organic linking group;

each $R^{12}$ is independently, H or optionally substituted alkyl;

each A independently is N, C—Cl, C—CN or C—NO$_2$;

each W is independently, —SR$^{13}$, —OR$^{14}$, —NR$^{15}$R$^{16}$ or halogen;

$R^{13}$, $R^{14}$, $R^{15}$ & $R^{16}$ are, each independently, H, optionally substituted alkyl, optionally substituted aryl or optionally substituted aralkyl; or $R^{14}$ and $R^{15}$ together with the nitrogen to which they are attached, form an optionally substituted five or six membered ring;

Especially preferred water-soluble magenta dyes for use in the composition according to the second aspect of the invention include C.I. Acid Red 52, C.I. Acid Red 289 or a dye of the Formula (9), (10) and (11) and salts thereof:

(a) from 1 to 99, more preferably from 3 to 70 and especially from 5 to 50 parts in total of the compound (s) of Formula (1); and (b) from 99 to 1, more preferably from 30 to 97 parts and especially 95 to 50 parts in total of the water-soluble magenta dye(s);

wherein the parts are by weight and the sum of the parts (a)+(b)=100.

The composition may contain a single dye of Formula (1) or a mixture of two or more dyes of the Formula (1). Similarly, the composition may contain a single water-soluble magenta dye other than a compound of Formula (1) or a mixture of two or more water-soluble magenta dyes other than compounds of Formula (1).

The compounds and compositions according to the first and second aspects of the present invention may be, and Formula (9)

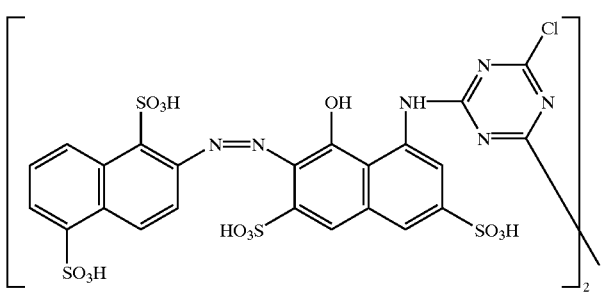

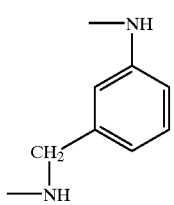

Formula (10)

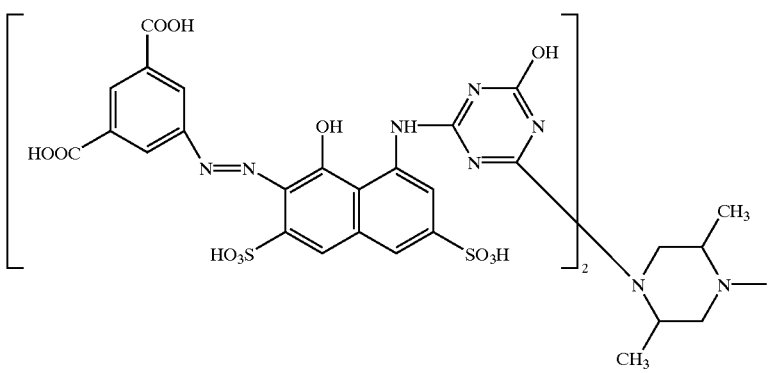

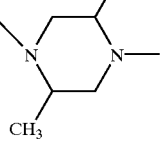

Formula (11)

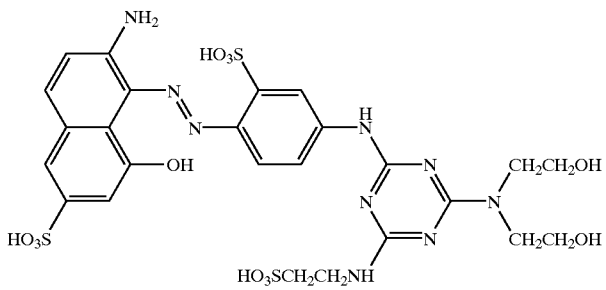

The dye of Formula (9) may be prepared using the method described in Example 1 of EP 0 559 310. The dye of the Formula (10) may be prepared using the method described in Example 3 of PCT publication number WO 94/16021. The dye of Formula (11) may be prepared using the method described in Example 1 of WO 96/24636.

The composition according to the second aspect of the present invention preferably comprises:

preferably are, purified to remove undesirable impurities before they are incorporated into inks for ink jet printing. Conventional techniques may be employed for purification, for example ultrafiltration, reverse osmosis and/or dialysis.

According to a third aspect of the present invention there is provided an ink comprising:

(a) a compound according to the first aspect of the present invention, or a composition according to the second aspect of the invention; and (b) a liquid medium.

Preferably component (a) of the ink is one of the preferred compounds or compositions as hereinbefore described in relation to the first or second aspect of the invention. More preferably component (a) is one or more compounds of the Formula (1) or Formula (4), as hereinbefore defined.

The liquid medium preferably comprises:
(i) water;
(ii) a mixture of water and an organic solvent; or
(iii) an organic solvent free from water.

The number of parts by weight of component (a) of the ink is preferably from 0.01 to 30, more preferably 0.1 to 20, especially from 0.5 to 15, and more especially from 1 to 5 parts. The number of parts by weight of component (b) is preferably from 99.99 to 70, more preferably from 99.9 to 80, especially from 99.5 to 85, and more especially from 99 to 95 parts. The number of parts (a)+(b) is 100.

Preferably component (a) is completely dissolved in component (b). Preferably component (a) has a solubility in component (b) at 20° C. of at least 10%. This allows the preparation of concentrates which may be used to prepare more dilute inks and reduces the chance of the compound(s) of component (a) of the ink precipitating if evaporation of the liquid medium occurs during storage.

When the liquid medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and is 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-miscible organic solvents.

Examples of further suitable ink media comprising a mixture of water and one or more organic solvents are described in U.S. Pat. No. 4,963,189, U.S. Pat. No. 4,703,113, U.S. Pat. No. 4,626,284, EP 425,150A and U.S. Pat. No. 5,207,824.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) &/or an alcohol (especially a $C_{1-4}$-alkanol, such as ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

An especially preferred ink comprises:
(a) from 1 to 10 parts in total of a compound or composition according to the first or second aspect of the invention;
(b) from 2 to 60, more preferably 5 to 40 parts of water-soluble organic solvent; and
(c) from 30 to 97, more preferably 40 to 85 parts water; wherein all parts are by weight and the sum of the parts (a)+(b)+(c)=100.

The ink may also contain additional components conventionally used in ink jet printing inks, for example viscosity and surface tension modifiers, corrosion inhibitors, biocides, kogation reducing additives, anti-cockle agents to reduce paper curling and surfactants which may be ionic or non-ionic.

The pH of the ink is preferably from 4 to 10.

When the ink according to the third aspect of the invention is used as an ink jet printing ink, the ink preferably has a concentration of less than 100 parts per million, more preferably less than 50 parts per million, in total of halide ions and divalent and trivalent metals. This reduces nozzle blockage in ink jet printing heads, particularly in thermal ink jet printers. The inks may be purified using conventional techniques, for example ultrafiltrating reverse osmosis, dialysis or a combination thereof.

A fourth aspect of the present invention provides a process for printing an image on a substrate comprising applying thereto by means of an ink jet printer an ink containing a compound according to the first aspect of the invention or a composition according to the second aspect of the invention.

The ink used in this process is preferably as defined in the third aspect of the present invention The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper.

Preferred papers are plain or treated papers which may have an acid, alkaline or neutral character. Examples of commercially available papers include, HP Premium Coated Paper, HP Photopaper (all available from Hewlett Packard Inc.), Stylus Pro 720 dpi Coated Paper, Epson Photo Quality Glossy Film, Epson Photo Quality Glossy Paper (available from Seiko Epson Corp.), Canon HR 101 High Resolution Paper, Canon GP 201 Glossy Paper, Canon HG 101 High Gloss Film (all available from Canon Inc.), Wiggins Conqueror paper (available from Wiggins Teape Ltd), Xerox Acid Paper and Xerox Alkaline paper, Xerox Acid Paper (available from Xerox).

A fifth aspect of the present invention provides a substrate, preferably a paper, an overhead projector slide or a textile material, printed with an ink according to the third aspect of the present invention or by means of the process according to the fourth aspect of the present invention.

According to a sixth aspect of the present invention there is provided an ink jet printer cartridge comprising a chamber and ink, wherein the ink is present in the chamber and the ink contains a compound or a composition according to the second or third aspect of the invention. Preferably the ink is an ink according to the third aspect of the invention.

According to an eighth aspect of the present invention there is provided an ink jet printer containing an ink jet printer cartridge, wherein the ink jet printer cartridge is as defined in the seventh aspect of the present invention.

The invention is further illustrated by the following Examples in which all parts and percentages are by weight unless otherwise stated.

EXAMPLE 1

Dye 1 was prepared in accordance with the following process:

Stage (a): Diazotisation and Coupling

Anthranilic acid (13.7 g, 0.1M) was dissolved in 500 ml water at pH 8 (2M NaOH), screened then added sodium nitrite (8.28 g, 0.12M). 30 ml concentrated hydrochloric acid in 100 ml ice and water at <5° C. was to this solution at <5° C. over 20 minutes. The mixture was then stirred for 2 hours at <5° C. and excess nitrous acid was destroyed using sulphamic acid.

Acetyl H-acid (51.8 g, 0.1M) was dissolved in 500 ml water, screened then allowed to stir at <5° C. while the above solution was added slowly over 30 minutes whilst maintaining the pH 7–8 with 2M NaOH and the temperature <5° C. The mixture was left to stir for 2 hours at <5° C. and pH 7–8, then the product was salted out using 20% w/v NaCl. The precipitate was filtered off and washed well with saturated brine then pulled dry on a filter.

Stage (b): Hydrolysis

The product of stage (a) was hydrolysed in 1 litre of water and 170 ml concentrated sodium hydroxide at 80° C. for 4 hours. The solution was then neutralised while hot to pH 8 using concentrated hydrochloric acid. The product was salted out by addition of 20% w/v NaCl, filtered off and washed well with saturated brine, pulled dry on a filter and then dried in the oven at 50° C.

Stage (c): Condensation with Cyanuric Chloride

The product of stage (b) (11.7 parts) was stirred in water (400 parts) adjusted to pH 8.5 using 2M NaOH. The resulting suspension was cooled to <5° C. then a slurry of cyanuric chloride (5.1 parts) dispersed in water (25 parts) with calsolene oil(0.1 parts) was added and the reaction mixture was left to stir at <5° C. for 2 hours maintaining pH 6.5 by the addition of 2M NaOH.

Stage (d): Condensation with DL-Lysine

DL-Lysine (2 parts) was then added to the reaction mixture in stage (c). The pH was raised to 8.5 with 2M sodium hydroxide and the temperature raised to 25° C. Stirred at 25° C./pH 8.5 for 3 hours.

Stage (e): Hydrolysis 1,4-diazabicyclo[2,2,2]octane (0.1 part) was added to the reaction mixture. The pH was raised to 11 with 2M sodium hydroxide and the temperature was raised to 80° C. Stirred at pH 11/80° C. for 1 hour to complete the hydrolysis. Sodium chloride was added to 20% w/v and the pH reduced to 5 with concentrated hydrochloric acid. The mixture was cooled to 60° C. and the product filtered off and washed with 15% sodium chloride solution.

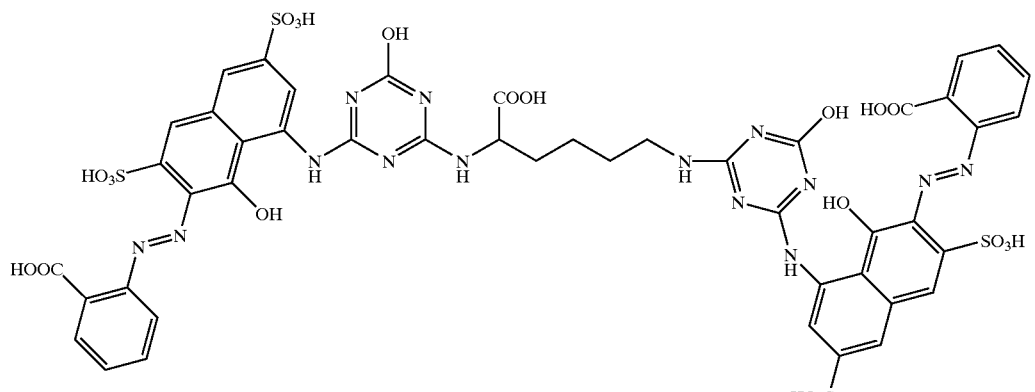

Dye (1)

Stage (f): Purification

The product of stage (e) was dissolved in dilute sodium hydroxide solution and dialysed to low conductivity using Visking tubing. The dialysed solution was filtered through Whatman GFF filter paper and the filtered solution evaporated to dryness to give the title product, 12 parts.

EXAMPLE 2 to 4

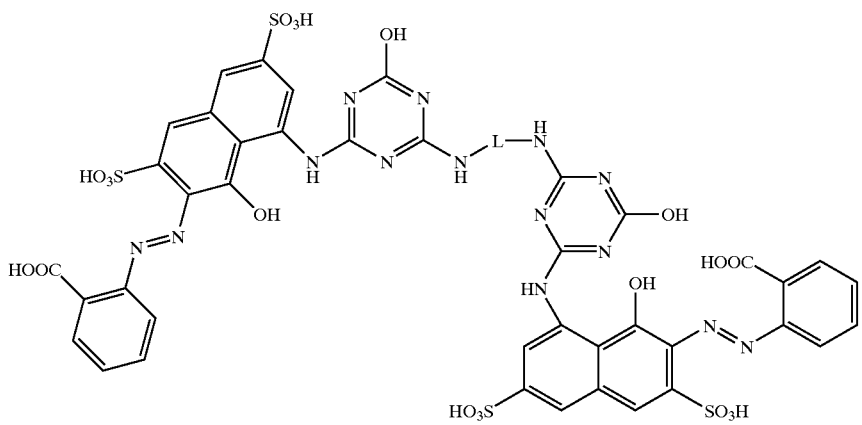

Dyes of the Formula (A) were prepared by condensing the compound of the formula XH-L-XH shown in Table 1 with approximately 2 molar equivalents of the product of stage (c) in Example 1. The resulting product was then hydrolysed by heating in aqueous sodium hydroxide to give the title product.

TABLE 1

| Example | XH-L-XH |
|---------|---------|
| 2 | $NH_2CH(COOH)CH_2SSCH_2CH(COOH)NH_2$ |
| 3 | $NH_2CH(COOH)(CH_2)_3NH_2$ |
| 4 | $NH_2CH(COOH)CH_2SH$ |

EXAMPLE 5

Dye(5) was prepared by condensing the diamine of the formula $NH_2CH(COOH)CH_2SS-CH_2CH(COOH)NH_2$ with approximately 2 molar equivalents of the product of Formula (A) stage (c) in Example 1. The resulting product was then condensed with 2 molar equivalents of 2-(2-aminoethoxy) ethanol. The pH was raised to 9.7 using 2M NaOH, then the solution was heated at 90° C. whilst maintaining the pH at 9.7 using 2M NaOH for 1 hour.

EXAMPLE 6 to 9

Dye (5)

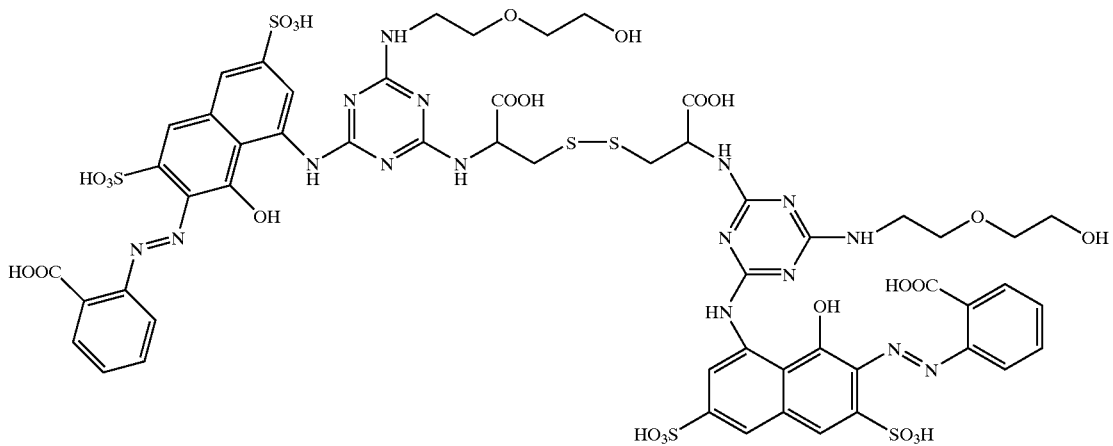

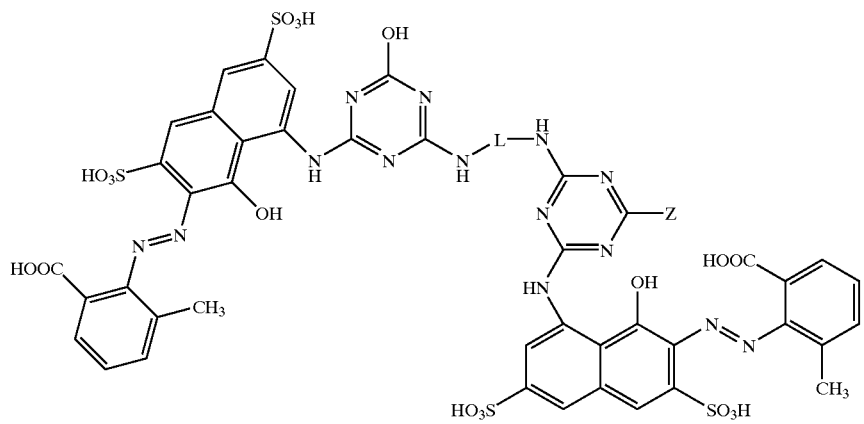

Formula (B)

Dyes of the Formula (B) were prepared using an analogous process to that described in Example 5 except that the anthranilic acid was replaced with 6-methyl anthranilic acid; the 2-(2-aminoethoxy)ethanol was replaced with the compound of the formula ZH shown in Table 2; and in place of the diamine of the formula $NH_2CH(COOH)CH_2$—SS—CH2CH(COOH)$NH_2$ there was used the diamine of the formula $NH_2LNH_2$ shown in Table 2.

TABLE 2

| Example | ZH | XH—L—XH |
|---|---|---|
| 6 | 2-(2-amino-ethoxy)ethanol | $NH_2CH(COOH)CH_2SSCH_2(COOH)NH_2$ |
| 7 | 2-aminoethylphosphonic acid | $NH_2CH(COOH)CH_2SSCH_2CH(COOH)NH_2$ |
| 8 | 2,3-dihydroxypropylamine | $NH_2CH(COOH)(CH_2)_3NH_2$ |
| 9 | morpholine | $NH_2CH(COOH)(CH_2)_3NH_2$ |

EXAMPLES 10 to 12 and in place of DL-Lysine there was used the diamine of the formula $NH_2LNH_2$ shown in Table 3.

TABLE 3

| Example | $NH_2LNH_2$ |
|---|---|
| 10 | $NH_2CH(COOH)CH_2SSCH_2CH(COOH)NH_2$ |
| 11 | $NH_2CH(COOH)(CH_2)_3NH_2$ |
| 12 | $NH_2CH(COOH)CH_2SSCH_2CH(COOH)NH_2$ |

EXAMPLE 13

Inks and Ink Jet Printing

The dyes described in Examples 1 to 13 were formulated into inks by dissolving 3.5 parts of the dye in 96.5 parts of a medium (adjusted to pH 9.5 with ammonium hydroxide) comprising:
  5 parts 2-pyrrolidone;
  5 parts thiodiglycol;
  2 parts Surfynol 465 (a non-ionic surfactant available from Air Products Inc.); and
  88 parts water. The resulting solution was then filtered through a 0.45 μm filter.

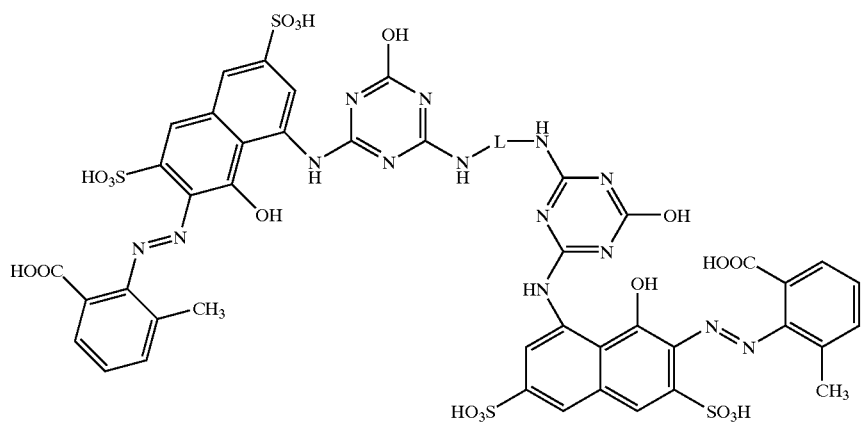

Formula (C)

Dyes of the Formula (C) were prepared using an analogous process to that described in Example 1 except that the anthranilic acid was replaced with 6-methyl anthranilic acid;

When ink jet printed onto paper, the inks provided prints with a bright magenta shade, high water-fastness and good light fastness.

Light-Fastness Measurement

The inks described above containing the dyes shown in Table 4 were printed onto the substrates shown in Table 4 using a Hewlett Packard DeskJet 690c ink jet printer.

After drying, each print was mounted, half covered, in an Atlas Ci35a weatherometer and irradiated for 100 hours. The prints were removed and the reflected optical density of the exposed and covered portions measured using an X-Rite™938 densitometer. These readings were used to calculate the optical density loss following the irradiation ($\Delta E$).

The light-fastness results for each substrate ($\Delta E$) are shown in Table 4. A low figure for $\Delta E$ indicates low fading, i.e. high light-fastness.

TABLE 4

| Dye Present in the Ink | Substrate | Light-fastness ($\Delta E$) |
|---|---|---|
| Example 5 | HR 101 | 29 |
| Example 5 | HG 201 | 16 |
| Example 5 | GP 201 | 21 |
| Example 2 | HR 101 | 20 |
| Example 2 | HG 201 | 12 |
| Example 2 | GP 201 | 13 |

In Table 4 the following abbreviations are used:
HR 101 is Canon HR101 coated ink jet paper, ex Canon Inc.
HG 201 is Canon HG 201 glossy film, ex Canon Inc.
GP 201 is Canon GP 201 glossy paper, ex Canon Inc.

In Table 4 the following abbreviations are used:
HR 101 is Canon HR 101 coated ink jet paper, ex Canon Inc.
HG 201 is Canon HG 201 glossy film, ex Canon Inc.
GP 201 is Canon GP 201 glossy paper, ex Canon Inc.

EXAMPLE 14

The inks described in Table 5, 6 and 7 may be prepared wherein the Dye described in the first column is the Dye made in the above Examples 1 to 5 of the corresponding number. Numbers quoted in the second column onwards refer to the number of parts of the relevant ingredient and all parts are by weight. The inks may be applied to paper by thermal or piezo ink jet printing.

The following abbreviations are used in Tables 5 to 7:

PG = propylene glycol
NMP = N-methyl pyrrolidone
CYC = cyclohexanol
P12 = propane-1,2-diol
CET = cetyl ammonium bromide
TBT = tertiary butanol
GLY = glycerol
H - 1,6 = Hexane 1,6-diol
CAP-L = caprolactam
EG = ethylene glycol
DEG-MBE = diethylene glycol monobutyl ether
PEG 200 = Polyethylene glycol (average molecular weight of 200)
DEG = diethylene glycol
TFP = 2,2,3,3-tetrafluoropropanol
2P = 2-pyrrolidone
UR = Urea
PHO = $Na_2HPO_4$ and
TDG = thiodiglycol
P-1,5 = Pentane-1,5-diol
CAP = caprolactone
TEA = triethanolamine
BUT = γ-butyrolactone

TABLE 5

| Ink | Dye | Dye Content | Water | PG | DEG | NMP | P-1,5 | TEA | CYC | BUT | CAP | EG | CAP-L |
|---|---|---|---|---|---|---|---|---|---|---|---|---|---|
| 1 | 1 | 3.0 | 90 | | 5 | | 4.8 | | 0.2 | | | | |
| 2 | 2 | 10.0 | 85 | 3 | | 3 | 3 | | | 5 | | | |
| 3 | 2 | 2.1 | 91 | | 8 | | | | | | | 1 | 1 |
| 4 | 3 | 3.1 | 86 | 5 | | | | | 0.2 | 4 | | | 4.8 |
| 5 | 4 | 1.1 | 81 | | | 9 | | 0.5 | 0.5 | | | | |
| 6 | 5 | 2.5 | 60 | 4 | 15 | 3 | | | | 6 | | 9 | 4 |
| 7 | 4 | 5 | 65 | | 20 | | 5 | | | 10 | | 5 | |
| 8 | 3 | 2.4 | 75 | 5 | 4 | | 5 | | | | 6 | | 5 |
| 9 | 3 | 4.1 | 80 | 3 | 5 | 2 | 9.7 | | 0.3 | | | | |
| 10 | 1 | 3.2 | 65 | | 5 | 4 | 6 | | | 5 | 4 | | 5 |
| 11 | 1 | 5.1 | 96 | | | | | | | | 4 | 6 | |
| 12 | 5 | 10.8 | 90 | 5 | | | | | | 5 | | | |
| 13 | 5 | 10.0 | 80 | 2 | 6 | 2 | 5 | | | 1 | | | |
| 14 | 3 | 1.8 | 80 | | 5 | | | | | | | 4 | |
| 15 | 5 | 2.6 | 84 | | | 11 | | | | | | 15 | |
| 16 | 5 | 3.3 | 80 | 2 | | 10 | | | | | 2 | 5 | 6 |
| 17 | 5 | 12.0 | 90 | | | | 7 | 0.3 | | 2.7 | | | |
| 18 | 2 | 5.4 | 69 | 2 | 20 | 2 | 1 | | | | | 3 | 3 |

TABLE 6

| Ink | Dye | Dye Content | Water | GLY | DEG | NMP | CET | TBT | TDG | UR | PHO | 2P | PI2 |
|---|---|---|---|---|---|---|---|---|---|---|---|---|---|
| 19 | 1 | 3.0 | 80 | 15 | | | 0.2 | | | | | 4.8 | |
| 20 | 2 | 9.0 | 90 | | 5 | | | | | | 1.2 | | 5 |
| 21 | 3 | 1.5 | 85 | 3.8 | 5 | | 0.16 | 4.64 | 0.2 | | | | |
| 22 | 4 | 2.5 | 90 | | | 6 | 3.88 | | | | 0.12 | | |
| 23 | 5 | 3.1 | 82 | 4 | 8 | | 0.3 | | | | | | 5.7 |
| 24 | 3 | 0.9 | 85 | | 10 | | | | | 4.8 | 0.2 | | |
| 25 | 2 | 8.0 | 90 | | 4.7 | 5 | | | 0.3 | | | | |
| 26 | 1 | 4.0 | 70 | | 10 | 4 | | | | 1 | | 4 | 11 |

TABLE 6-continued
| Ink | Dye | Dye Content | Water | GLY | DEG | NMP | CET | TBT | TDG | UR | PHO | 2P | PI2 |
|---|---|---|---|---|---|---|---|---|---|---|---|---|---|
| 27 | 2 | 2.2 | 75 | 4 | 10 | 3 | | | | 2 | | 6 | |
| 28 | 1 | 10.0 | 91 | | | 6 | | | | | | 3 | |
| 29 | 5 | 9.0 | 76 | | 9 | 7 | | 2.05 | | | 0.95 | 5 | |
| 30 | 3 | 5.0 | 78 | 5 | 11 | | | | | | | 6 | |
| 31 | 1 | 5.4 | 86 | | | 7 | | | | | | 7 | |
| 32 | 1 | 2.1 | 70 | 5 | 5 | 5 | 0.1 | 0.2 | 0.1 | 5 | 0.1 | 9.5 | |
| 33 | 3 | 2.0 | 90 | | 10 | | | | | | | | |
| 34 | 2 | 2 | 88 | | | 2 | | | 10 | | | | |
| 35 | 4 | 5 | 78 | | | 5 | | | 12 | | | 5 | |
| 36 | 2 | 8 | 70 | 2 | | 8 | | | 15 | | | 5 | |
| 37 | 1 | 10 | 80 | | | | | | 8 | | | 12 | |
| 38 | 4 | 10 | 80 | | 10 | | | | | | | | |
TABLE 7
| Ink | Dye | Dye Content | Water | PEG 200 | DEG-MBE | NMP | H-1,6 | TEA | TFP | BUT | CAP | EG | CAP-L |
|---|---|---|---|---|---|---|---|---|---|---|---|---|---|
| 39 | 1 | 2.0 | 80 | 5 | | 6 | 4 | | | | | 5 | |
| 40 | 2 | 3.0 | 90 | | 5 | 4.8 | | 0.2 | | | | | |
| 41 | 3 | 10.0 | 85 | 3 | | 3 | 3 | | | 5 | | 1 | |
| 42 | 4 | 2.1 | 91 | | 8 | | | | | | | | 1 |
| 43 | 5 | 3.1 | 86 | 5 | | | | | 0.2 | 3.8 | | | 5 |
| 44 | 3 | 1.1 | 81 | | | 9 | | 0.5 | 0.5 | | | 9 | |
| 45 | 1 | 2.5 | 60 | 4 | 15 | 3 | 3 | | | 6 | | 5 | 4 |
| 46 | 3 | 5 | 65 | | 20 | | | | | 10 | | | |
| 47 | 5 | 2.4 | 75 | 5 | 4 | | 5 | | | | 6 | | 5 |
| 48 | 5 | 4.1 | 80 | 3 | 5 | 2 | 9.7 | | 0.3 | | | | |
| 49 | 1 | 3.2 | 70 | | 5 | 4 | 6 | | | 5 | 4 | 6 | 5 |
| 50 | 1 | 5.1 | 96 | | | | | | | | 4 | | |
| 51 | 1 | 10.8 | 90 | 5 | | | | | | 5 | | | |
| 52 | 2 | 10.0 | 80 | 2 | 6 | 2 | 5 | | | 1 | | 4 | |
| 53 | 3 | 1.8 | 80 | | 5 | | | | | | | 15 | |
| 54 | 4 | 2.6 | 84 | | | 11 | | | | | | 5 | |
| 55 | 5 | 3.3 | 80 | 2 | | | 10 | | | | 2 | | 6 |
| 56 | 4 | 12.0 | 90 | | | 7 | | 0.3 | | 2.8 | | | |
| 57 | 2 | 5.4 | 69 | 2 | 20 | 2 | 1 | | | | | 3 | 3 |
| 58 | 2 | 6.0 | 91 | | | 4 | | | | | | 5 | |
What is claimed is:
1. A compound of the Formula (1) and salts thereof:
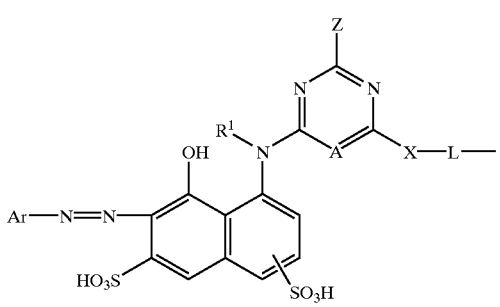
Formula (1)
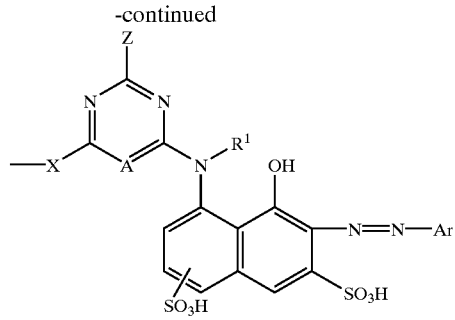
wherein:
each A independently is N, C—Cl, C—CN or C—NO$_2$;
each Ar independently is a substituted aryl group carrying a —COOH group ortho to the azo (—N=N—) group;

L is an aliphatic group carrying a —COOH, —SO₃H or —PO₃H₂ group;

each Z independently is —SR², —OR³, —NR⁴R⁵ or a labile atom or group;

each X independently is —S—, —O— or —NR¹—;

each R¹ independently is H or optionally substituted alkyl; and

R², R³, R⁴ and R⁵ are independently H, optionally substituted alkyl, optionally substituted aryl or optionally substituted aralkyl; or R⁴ and R⁵ together with the nitrogen to which they are attached form an optionally substituted five or six membered ring.

2. A compound according to claim 1 wherein each Ar independently is optionally substituted 1-carboxy-naphth-2-yl or optionally substituted 2-carboxy phenyl.

3. A compound according to claim 1 wherein each Ar is 2-carboxyphenyl.

4. A compound according to claim 1 wherein each Z independently is —SR², —OR³ or —NR⁴R⁵ wherein R² R³, R⁴ and R⁵ are as defined in claim 1.

5. A compound according to claim 1 wherein L is an optionally interrupted alkenylene group or an optionally interrupted alkylene group containing up to 20 carbon atoms, said group carrying a —COOH, —SO₃H or —PO3H₂ group.

6. A compound according to claim 1 wherein L is an optionally interrupted C₂₋₂₀-alkylene group which carries a —SO₃H, —COOH or —PO₃H₂ group.

7. A compound according to claim 6 wherein L is optionally interrupted by one or more of —O—, —S—, —SS—, or —NR¹— wherein R¹ is H or optionally substituted alkyl.

8. A compound according to claim 1 of the Formula (4) and salts thereof:

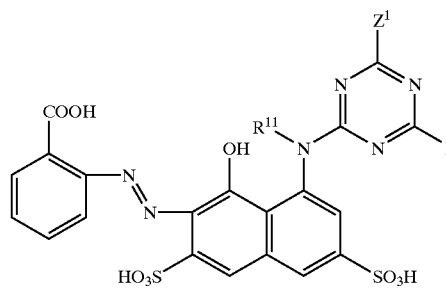

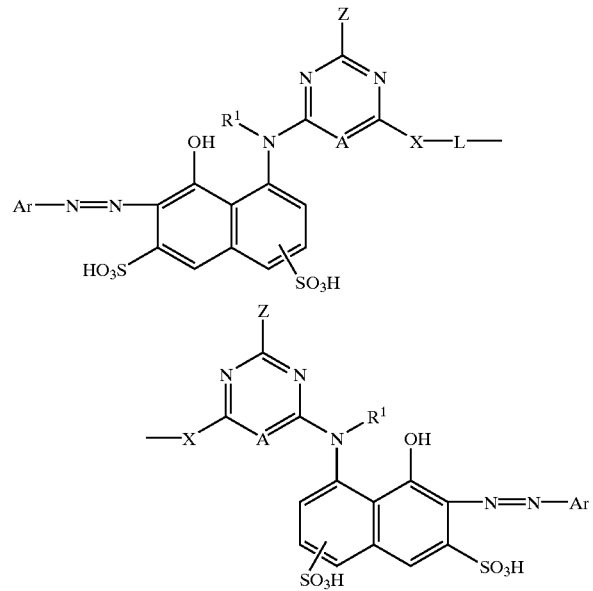

wherein:
each A independently is N, C—Cl, C—CN or C—NO₂;
each Ar independently is a substituted aryl group carrying a —COOH group ortho to the azo (—N=N—) group;
L is an aliphatic group carrying a —COOH, —SO₃H or —PO₃H₂ group;
each Z independently is —SR², —OR³, —NR⁴R⁵ or a labile atom or group;

Formula (4)

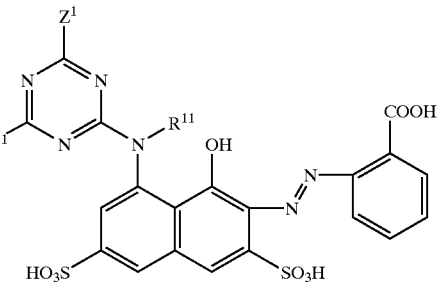

wherein:
L₁ is a C₂₋₂₀-alkylene group carrying a —SO₃H or —COOH group;
each R¹¹ independently is H or C₁₋₄-alkyl optionally substituted by —OH, —COOH, —SO₃H or —CN;
each Z¹ independently is —SR², —OR³ or —NR⁴R⁵; and R², R³, R⁵ and R⁵ are as defined.

9. A compound according to claim 8 wherein each Z¹ independently is —OH, —SH or —NR⁹R¹⁰, wherein R⁹ and R¹⁰ each independently is H, C₁₋₆-alkyl optionally substituted by —OH, C₁₋₄-alkoxy, C₁₋₄-hydroxyalkoxy, —COOH or —SO₃H.

10. A composition comprising:
(a) one or more compound of the Formula (1) and salts thereof:

each X independently is —S—, —O— or —NR¹;
each R¹ independently is H or optionally substituted alkyl; and
R², R³, R⁴ and R⁵ are independently H, optionally substituted alkyl, optionally substituted aryl or optionally substituted aralkyl; or
R⁴ and R⁵ together with the nitrogen to which they are attached form an optionally substituted five or six membered ring; and
(b) one or more water-soluble magenta dye other than a compound of Formula (1).

11. An ink comprising:
(a) a compound according to claim 1, and
(b) a liquid medium.

12. An ink according to claim 11 which has a concentration of less than 100 parts per million in total of halide ions and divalent and trivalent metals.

13. A process for printing an image on a substrate comprising applying thereto by means of an ink jet printer an ink containing a compound according to claim 1.

14. A substrate printed with an ink according to claim 11.

15. An ink jet printer cartridge comprising a chamber and ink, wherein the ink is present in the chamber and the ink contains a compound according to claim 1.

16. An ink jet printer containing an ink jet printer cartridge, wherein the ink jet printer cartridge is as defined in claim 15.

17. An ink comprising:

(a) a composition according to claim 10, and (b) a liquid medium.

18. An ink according to claim 17, which has a concentration of less than 100 parts per million in total halide ions and divalent and trivalent metals.

19. A process for printing an image on a substrate comprising applying thereto by means of an ink jet printer an ink containing a composition according to claim 10.

20. A substrate printed by means of the process according to claim 19.

21. An ink jet printer cartridge comprising a chamber and ink, wherein the ink is present in the chamber and the ink contains a composition according to claim 10.

22. An ink jet printer containing an ink jet cartridge, wherein the ink jet cartridge is as defined in claim 21.

* * * * *

UNITED STATES PATENT AND TRADEMARK OFFICE
CERTIFICATE OF CORRECTION

PATENT NO. : 6,506,241 B1 Page 1 of 1
DATED : January 14, 2003
INVENTOR(S) : Julie A. Stocks et al.

It is certified that error appears in the above-identified patent and that said Letters Patent is hereby corrected as shown below:

<u>Title page, Item [54] and Column 1, line 1,</u>
Title, please delete "BIX-AZO" and insert -- BIS-AZO --.

Signed and Sealed this

Thirty-first Day of August, 2004

JON W. DUDAS
*Director of the United States Patent and Trademark Office*